United States Patent [19]

Fukuda et al.

[11] Patent Number: 4,983,653
[45] Date of Patent: * Jan. 8, 1991

[54] POLYESTER SHRINKABLE FILM CONTAINING BENZOTRIAZOLE

[75] Inventors: Yujiro Fukuda, Machida; Hiromi Yamashita, Yokohama, both of Japan

[73] Assignee: Diafoil Company, Ltd., Tokyo, Japan

[*] Notice: The portion of the term of this patent subsequent to May 2, 2008 has been disclaimed.

[21] Appl. No.: 333,977

[22] Filed: Apr. 6, 1989

Related U.S. Application Data

[63] Continuation-in-part of Ser. No. 119,623, Nov. 12, 1987.

[30] Foreign Application Priority Data

| Date | Country | Number |
|---|---|---|
| Nov. 12, 1986 [JP] | Japan | 61-269251 |
| Dec. 11, 1986 [JP] | Japan | 61-295590 |
| Dec. 15, 1986 [JP] | Japan | 61-298427 |
| Feb. 17, 1987 [JP] | Japan | 62-33731 |
| Mar. 11, 1987 [JP] | Japan | 62-56236 |
| Jun. 11, 1987 [JP] | Japan | 62-145753 |
| Oct. 26, 1987 [JP] | Japan | 62-269765 |
| Apr. 9, 1988 [JP] | Japan | 63-87948 |

[51] Int. Cl.$^5$ .................. C08K 5/34; C08G 63/00; C08G 63/88
[52] U.S. Cl. ............... 524/91; 528/308.1; 528/308.2; 528/305; 528/502
[58] Field of Search ........... 528/308.2, 308.1, 305, 528/502; 524/91

[56] References Cited

U.S. PATENT DOCUMENTS

| | | | |
|---|---|---|---|
| 3,455,720 | 7/1969 | Davies et al. | 528/308.2 |
| 3,595,836 | 7/1971 | Korneli et al. | 528/308.2 |
| 4,020,141 | 4/1977 | Quinn et al. | 264/289 |
| 4,072,779 | 2/1978 | Knox et al. | 528/308.2 |
| 4,096,126 | 6/1978 | Tanaka et al. | 528/305 |
| 4,141,735 | 2/1979 | Schrader et al. | 528/309 |
| 4,265,804 | 5/1981 | Zannucci et al. | 524/91 |
| 4,275,107 | 6/1981 | Bartkus et al. | 528/308.2 |
| 4,344,830 | 8/1982 | Olson | 524/91 |
| 4,362,775 | 12/1982 | Yabe | 428/213 |
| 4,476,170 | 10/1984 | Jabarin | 528/308.2 |
| 4,535,025 | 8/1985 | Jabarin | 528/308.2 |
| 4,546,030 | 10/1985 | Minami et al. | 528/308.2 |
| 4,603,073 | 7/1986 | Renalls et al. | 528/308.2 |
| 4,751,139 | 6/1988 | Hensel et al. | 528/308.2 |

FOREIGN PATENT DOCUMENTS

| | | | |
|---|---|---|---|
| 210646 | 2/1987 | European Pat. Off. | |
| 1187792 | 2/1965 | Fed. Rep. of Germany | |
| 57-42726 | 3/1982 | Japan | |
| 57-119941 | 7/1982 | Japan | 524/91 |
| 57-119941 | 7/1982 | Japan | 524/91 |
| 57-159618 | 10/1982 | Japan | |
| 57-194950 | 11/1982 | Japan | |
| 59-45202 | 3/1984 | Japan | |
| 59-97175 | 6/1984 | Japan | |
| 60-206839 | 10/1985 | Japan | |
| 60-232948 | 11/1985 | Japan | |
| 60-253545 | 12/1985 | Japan | |
| 61-64430 | 4/1986 | Japan | |
| 60-64430 | 4/1986 | Japan | |
| 61-203161 | 9/1986 | Japan | |
| 62-95341 | 5/1987 | Japan | |
| 63-55052 | 3/1988 | Japan | |
| 825549 | 12/1959 | United Kingdom | |
| 989080 | 4/1965 | United Kingdom | |

*Primary Examiner*—John Kight, III
*Assistant Examiner*—Dennis R. Daley
*Attorney, Agent, or Firm*—Oblon, Spivak, McClelland, Maier & Neustadt

[57] ABSTRACT

Disclosed herein is a polyester shrinkable film. The film according to the present invention can provide extremely excellent durability and long-time storability of contents of a container in labelling and shrink packaging use.

5 Claims, No Drawings

POLYESTER SHRINKABLE FILM CONTAINING BENZOTRIAZOLE

CROSS-REFERENCE TO RELATED APPLICATION

This is a continuation-in-part application of U.S. Patent application Ser. No. 119,623 filed Nov. 12, 1987 which is still pending.

BACKGROUND OF THE INVENTION

The present invention relates to a shrinkable film excellent in durability upon transportation of containers, long-time storability of contents in the containers, etc.

In recent years, shrinkable films have generally been used for labeling for containers such as PET bottles, glass bottles, etc. or shrink packaging applications. However, shrinkable films in the prior art involve problems in view of the durability and the long-time storability when they are used for labeling or shrink packaging application. That is, in containers labeled or applied with close packaging by means of shrinkable films such as of polyvinyl chloride or polystyrene, the films have often been broken due to the contact of the containers with each other upon long-distance transportation of the containers to bring about a problem in view of the appearance.

On the other hand, in the case of applying shrink packaging to those containers filled with brewages such as Japanese sake, beer or wine, since both of the container and the shrinkable film are highly transparent, when the containers are exposed to direct sunlight they inevitably suffer from degradation in the quality of the filled drinks, particularly, due to ultraviolet rays.

With the reason as described above, there has been strongly demanded for a shrinkable film excellent in the durability upon transportation of containers and also excellent in long-time storability of the content.

In view of the foregoing problems, the present inventors have made an earnest study and have accomplished the present invention based on the finding that the durability and the long-time storability can be improved by using a polyester shrinkable film having specified shrinking characteristic and ultraviolet ray-absorbing characteristic.

SUMMARY OF THE INVENTION

In an aspect of the present invention, there is provided a polyester shrinkable film containing from 0.1 to 20% by weight of a ultraviolet ray absorber having a shrinkage of not less than 20% in one of longitudinal and transverse directions and not greater than 15% in the other direction of a film after treatment for five minutes at 100° C. in air oven, and light transmittance of the film at a wave length of 390 nm of not greater than 20%.

DETAILED DESCRIPTION OF THE INVENTION

The present invention relates to a polyester shrinkable film having a shrinkage of not less than 20% in one of longitudinal or transverse directions and not greater than 15% in the other direction of the film after the treatment for five minutes at 120° C. in air oven, and light transmittance of the film at a wave length of 30 nm not greater than 20%.

The polyester used in the present invention may be any of homopolyesters or copolyesters comprising, as the carboxylic acid component, one or more of known dicarboxylic acids such as terephthalic acid, oxalic acid, malonic acid, succinic acid, adipic acid, azelaic acid, sebacic acid, phthalic acid, isophthalic acid, naphthalene dicarboxylic acid and diphenylether dicarboxylic acid and, as the diol component, one or more of known diol such as ethylene glycol, neopentyl glycol, propylene glycol, trimethylene glycol, tetramethylene glycol, hexamethylene glycol, diethylene glycol, polyalkylene glycol and 1,4-cyclohexane dimethanol.

As the copolyester, those obtained by using two or more of dicarboxylic acids and/or diols as the dicarboxylic acid component and/or diol component. Also, polyester prepared by using other ingredients, for example, hydroxycarboxylic acid such as p-hydroxybenzoic acid and p-hydroxyethoxybenzoic acid, mono-functional compound such as benzoic acid, benzoyl benzoic acid, methoxypolyalkylene glycol, polyfunctional compound such as glycerin, penthaerythritol, trimethyrol and trimethylene propane within such a range that the product can be substantially a linear high molecular can also be used.

As the polyester usable in the present invention, those copolyesters in which the dicarboxylic acid component mainly comprises terephthalic acid, the diol component mainly comprises ethylene glycol, and the copolymer ingredient comprises isophthalic acid and phthalic acid as the dicarboxylic acid component and neopentyl glycol, diethylene glycol, polyalkylene glycol and, if required, 1,4-cyclohexane dimethanol as the diol component are preferred since they are available industrially at a reduced cost and show satisfactory shrinking property for the resultant film.

In the polyester used in the present invention, not less than 70 mol %, more preferably, not less than 75 mol % of the dicarboxylic acid component is a terephthalic acid unit, while not less than 70 mol %, more preferably, not less than 75 mol % of the diol component is an ethylene glycol unit. Those copolyesters with the terephthalic acid unit and/or ethylene glycol unit is less than 70 mol % are not preferred since the strength and the solvent resistance of the resultant film are poor.

Further, those polymers other than the polyester may be admixed to the polyester described above so long as the amount added is not greater than 30 mol % based on the entire amount of the mixture.

Further, fine particles of organic and inorganic lubricants, etc. may preferably be incorporated in order to improve the slipperiness of the film. Further, additives such as stabilizer, colorant, antioxidant, defoamer, antistatic agent, etc. may also be incorporated as required. As fine particles for providing a good slipperiness, there can be mentioned those known inert external particles such as kaolin, clay, calcium carbonate, silicon oxide, potassium terephthalate, aluminum oxide, titanium oxide, calcium phosphate, lithium fluoride and carbon black and; high melting organic compounds not melted upon molten film formation of polyester resin; crosslinked polymer and internal particles formed at the inside of polyesters upon production thereof by metal catalyst, for example, alkali metal compound, alkaline earth metal compound, etc. used for the synthesis of the polyester. The fine particles contained in the shrinkable film is preferably from 0.005 to 5.0% by weight and the preferred average particle size is from 0.001 to 3.5 μm.

The light transmittance of the shrinkable film according to the present invention at a wave length of 390 nm is from 0.1 to 20%, preferably from 0.1 to 10% and, more preferably from 0.1 to 5%. Those films having light transmittance over 20% are insufficient for the absorption capacity for the entire ultraviolet region and can not provide long-time storability for the contents of containers. In a case where they are applied to containers of brewages such as sake and wine, the contents are remarkably discolored due to oxidation.

For providing the film with ultraviolet absorbing capacity, it is possible to dispose a coating layer on the film surface during or after the production of the film, ultraviolet absorbers are usually contained in the polyester. The ultraviolet absorber can be selected, for example, from benzophenones, benzotriazoles, salicylic acid derivatives, cyanoacrylates, oxalic acid anilide, etc. and, particularly, those ultraviolet absorbers having 10% weight loss temperature ($T_{10}$) upon thermogravimetric analysis of not lower than 200° C., preferably, not lower than 220° C. are preferred since the contaminations in each of the production steps can be reduced. If $T_{10}$ is lower than 200° C., sublimation or decomposition is undesirably caused to the ultraviolet absorbers.

As the benzophenone type ultraviolet absorber, there can be mentioned, for example,
2-hydroxybenzophenone,
2,4-dihydroxybenzophenone,
2-hydroxy-4-methoxybenzophenone,
2-hydroxy-4-octoxybenzophenone,
2-hydroxy-4-dodecyloxybenzophenone,
2-hydroxy-4-octadecyloxybenzophenone,
2-hydroxy-4-(2-hydroxy-3-methacryloxy)-propoxybenzophenone,
2-hydroxy-4-chlorobenzophenone,
2-hydroxy-4-methoxy-5-sulfobenzophenone,
2-hydroxy-4-methoxy-2'-carboxybenzophenone,
2,2'-dihydroxybenzophenone,
2,2'-dihydroxy-4-methoxybenzophenone,
2,2'-dihydroxy-4,4'-dimethoxybenzophenone,
2,2',4,4'-tetrahydroxybenzophenone and
sodium 2,2'-dihycroxy-4,4'-methoxy-5'-sulfobenzophenone.

As the benzotriazole type ultraviolet absorber, there can be mentioned, for example,
2-(2'-hydroxyphenyl)benzotriazole,
2-(2'-hydroxy-5'-methylphenyl)benzotriazole,
2-(2'-hydroxy-5'-t-butylphenyl)benzotriazole,
2-(2'-hydroxy-5'-t-octylphenyl)benzotriazole,
2-(2'-hydroxy-4'-octoxyphenyl)benzotriazole,
2-(2'-hydroxy-3',5'-di-t-butylphenyl)benzotriazole
2-(2'-hydroxy-3',5'-bis- α,α-dimethylbenzylphenyl)-2H-benzotriazole,
2-(2'-hydroxy-3'-t-butyl-5'-methylphenyl)-5-chlorobenzotriazole,
2-(2'-hydroxy-3',5'-di-t-butylphenyl)-5-chlorobenzotriazole.

As the salicylic acid derivative type ultraviolet absorber, there can be mentioned, for example, phenyl salicylate, p-t-butylphenyl salicylate and p-octylphenyl salicylate.

As the cyanoacrylate type ultraviolet absorber, there can be mentioned, for example,
2-ethyl-2-cyano-3,3'-diphenyl acrylate and
2-ethylhexyl-2-cyano-3,3'-diphenyl acrylate As other ultraviolet absorbers, there can be mentioned, for example,
dimethyl p-methoxybenzilidenemalonate,
dibenzoylresorcinole,
hexamethylphosphoric triamine,
tetraphenylsuccinylate dinitrile,
[2,2'-thiobis(4-t-octylphenolate)]-n-butylamine nickel (II) nickel-bis(octylphenyl)sulfide,
nickel complex-3,5-di-t-butyl-4-hydroxybenzyl phosphoric acid monoethylate,
nickel butyldithiocarbide,
naphthalene tetracarboxylic acid diimide,
bis-(5-benzoyl-4-hydroxy-2-methoxyphenyl)methane,
2,2'-p-phenylene-bis(3,1-benzooxazin-4-one).

Among the compounds as described above, particularly preferred are:
2-(2'-hydroxy-5'-methylphenyl)benzotriazole,
2-(2'-hydroxy5'-t-octylphenyl)benzotriazole,
2-[2'-hydroxy-3',5'-bis(α,α-dimethylbenzyl)phenyl]-2H-benzotriazole,
naphthalene tetracarboxylic acid diimide,
bis(5-benzoyl-4-hydroxy-2-methoxyphenyl)methane and
2,2'-p-phenylene bis(3,1-benzooxazin-4-one).

While the ultraviolet absorber may be incorporated into a film by adding during polymerization, adding before film-formation or by previously forming a master batch, the method of forming the master batch is preferred since the contaminations by the ultraviolet absorber in the step can be reduced.

The content of the ultraviolet absorber in the shrinkable film is preferably from 0.1 to 20% by weight and, more preferably from 0.2 to 10% by weight. If the content is less than 0.1% by weight, the ultraviolet absorbing capacity is insufficient, whereas if it exceeds 20 wt %, sublimation products are formed and bleedout of the ultraviolet absorber to the film surface are caused and they are no more usable.

The film according to the present invention has a shrinkage of from 20 to 80%, preferably, from 30 to 80% in one of longitudinal and transverse directions (hereinafter referred to as the main shrinking direction), after treatment for 5 minutes in an air oven at 100° C. In the shrinkable film according to the present invention, the shrinkage in the main shrinking direction of less than 20% is not preferred since the amount of shrinkage when shrunk as a label is insufficient and the film is not closely fit to the container.

Further, the shrinkable film according to the present invention has a shrinkage from −10 to 15%, preferably from −5 to 10% and, more preferably from −5 to 5% in the other direction perpendicular to the main shrinking direction after treatment for 5 minutes in an air oven at 100° C.

A film having the shrinkage of larger than 15% is not preferred since the film when shrunk as a label remarkably shrinks along the longitudinal direction of the container to cause distortion of patterns, etc.

For improving the durability of the shrinkable film, the strength at break in the main shrinking direction is, preferably, from 20 to 40 kg/mm$^2$, more preferably, from 25 to 40 kg/mm$^2$.

The intrinsic viscosity $[\eta]$ of the shrinkable film according to the present invention is, preferably, from 0.50 to 1.20, more preferably, from 0.60 to 1.20 and, particularly preferably, from 0.65 to 1.20. If the intrinsic viscosity of the film is less than 0.50, crystallinity becomes higher, failing to obtain sufficient shrinkage.

The heat of fusion of the shrinkable film according to the present invention is preferably of not greater than 8 cal/g, more preferably, not greater than 6 cal/g and, particularly preferably, from 2 to 6 cal/g. A film with the heat of fusion of excess of 8 cal/g is not preferred since the shrinking characteristic is reduced. It is considered that the reduction is due to the progress of crystallization when the film is heated in a shrink tunnel to cause an uneven shrinkage.

Further, the maximum shrinkage (neck-in ratio) of the shrinkable film according to the present invention in the direction in perpendicular to the main shrinking direction after treatment for 5 sec in water at 75° C. while fixing both ends of the film in the main shrinking direction is, preferably, from 1 to 20% and, more preferably, from 2 to 15%. A film having the neck-in ratio in excess of 20% is not preferred since distortion or oblique buckling are caused frequently upon shrinking as a label.

The double refraction index of the shrinkable film according to the present invention is, preferably, from 0.040 to 0.120 and, more preferably, from 0.040 to 0.090.

A film with a double refraction index of lower than 0.040 is not preferred since it is poor in warm water proofness, solvent resistance, etc as a label. Further, a film with a double refractive index in excess of 0.120 is not preferred since the shrinking stress occurring along the main shrinking direction is increased to reduce the shrinking characteristic.

In the shrinkable film according to the present invention, it is also possible to provide a cushioning effect and improve breaking strength of bottle after the packaging of glass bottles, etc. by printing a foaming ink layer or laminating a thermoplastic resin film or sheet having fine cells inside thereof on one or both surfaces of the film. As the thermoplastic resin, any of known thermoplastic resins such as polyvinyl chloride, polyethylene, polypropylene, acrylic polymer, polystyrene and polyester resins may be used.

There is no particular restriction for the thickness of the shrinkable film according to the present invention but the thickness, when used a shrinkable film for labelling use is, preferably, from 10 to 300 μm and, more preferably, from 20 to 200 μm.

Description is to be made specifically for the method of producing the film according to the present invention but the method is not particularly limited to the following production methods.

After drying a polyester containing an appropriate amount of a ultraviolet absorber and inorganic particles as the lubricant, etc. as required by a usual drier such as a hopper drier or a paddle drier or by using a vacuum drier, it was extruded at a temperature of 200° to 320° C. As the extruding means, any of known methods such as a T-die method or tubular method may be employed. A non-stretched film obtained by rapid cooling after extrusion is stretched in at least one of longitudinal and transverse directions by, preferably, from 2.5 to 6.0 times and more preferably, from 3.0 to 5.0 times. During the stretching step, it is preferred that the film is uniformly heated in such a way that the surface temperature $T_1$ of the film is from Tg $-10°$ C. to Tg$+40°$ C. (Tg means glass transition temperature of the polyester) at the start of the stretching and is stretched under such a condition that the surface temperature of the film reaches to $T_1-50°$ C. to $T_1+5°$ C., preferably, from $T_1-50°$ C. to $T_1$ at the end of the stretching. This stretching method is preferred to reduce uneven thickness of the film and increase shrinkage at a lower temperature.

For the stretching method, longitudinal mono-axial stretching by means of rolls, transverse mono-axial stretching by means of tenter and usual biaxial stretching are used. It is also possible to stretch at a high ratio in one of the longitudinal and transverse directions, while stretching at a ratio as low as possible in the other direction. As the biaxial stretching method, known sequential biaxial stretching or simultaneous stretching may be used. Further, re-stretching may also be applied.

It is preferred for such stretched film to apply heat treatment at 60° to 100° C. for 0.1 sec to 5 min, more preferably, from 0.1 sec to 60 sec in order to obtain a desired neck-in ratio. The heat treatment can be conducted under fixing with stress, relaxation of not more than 20% or tentering, for which known method can be used such as contact with heating rolls, gripping by a clip in a tenter, etc. Re-stretching may also be applied after heat treatment.

It is also possible to apply corona discharging treatment on one or both of the film surfaces during, before or after the stretching to improve the adhesion of the film to the printing layer, etc.

Further, it is also possible to improve the ultraviolet absorbing property, adhesion, antistatic property, slipperiness, light screening property, etc. of the film by applying coating to one or both of the film surfaces during, before or after the stretching.

The thus obtained film is taken up into a product.

Shrinkable films used for labels of extremely excellent durability upon transportation of containers and long-time storability of contents in containers can be obtained by satisfying the above requirements of the present invention.

The present invention is to be described more specifically referring to examples, but the invention is not restricted only to these examples unless it goes beyond the scope of the invention.

The method of evaluating the film is shown below.

(1) Shrinkage factor

A film specimen in a strip form of 1 cm width was subjected to heat shrinking treatment for 5 min in a geared oven at a temperature of 100±2° C. without load and the shrinkage was determined in accordance with the following equation:

$$\text{Shrinkage} = \frac{L_o - L}{L_o} \times 100 \, (\%)$$

$L_o$: original length (10 cm)
L: length after shrinking (cm)

(2) Light Transmittance

Transmittance at a wavelength of 390 nm was measured by using a self-recording photospectrometer Model 340 manufactured by Hitachi Limited.

(3) Intrinsic Viscosity of Film [η]

200 mg of specimen was dissolved in 20 ml of a mixed solvent comprising phenol/tetrachloroethane at 50/50 ratio by heating at about 110° C. for 1 hour, and the viscosity was measured at 30° C.

(4) 10% Weight Loss Temperature ($T_{10}$) of Ultraviolet Absorber

Thermogravimetric analysis was conducted at a temperature increasing rate of 10° C./min by using SSC 580/TG-DTA 20 manufactured by Seiko Denshi Kogyo Co. and the temperature at which the weight loss reached 10% was measured.

(5) Strength at Break (main shrinking direction)

A film of 15 mm width and inter-chuck length of 50 mm was stretched at 20° C., 65% RH by 50 mm/min using a TENSILON (UTN-III) manufactured by TOYO-BALDWIN CO., and the strength of the film upon break was divided by the initial cross sectional area, which was expressed by kg/mm².

(6) Film Durability

After making a film into a cylindrical label, it was fitted over a PET bottle and caused to shrink by passing through a shrink tunnel.

The upper surface of the label was rubbed with a pencil of H hardness and evaluation was made as X for those easily broken and as O for those showing no substantial change.

(7) Storability of Contents

In the same procedures as in (6) above, SAKE was filled in a transparent PET bottle and the film was shrunk. In this case, the film was shrunk so as to cover more than 95% of the side of the bottle.

After capping the PET bottle and left for three days outdoor, change of the SAKE contents was observed. Evaluation was made as X for those causing yellow discoloration and deterioration in the quality and as O for those showing no changes in view of the appearance.

EXAMPLE 1

Polyethylene terephthalate with $[\eta]=0.66$ was blended with 20% by weight of a ultraviolet absorber: 2-(2'-hydroxy-5'-t-octylphenyl)benzotriazole (Cyasorb UV5411; registered trade mark of products from Cyanamid Co.)($T_{10}=232°$ C.), and then kneaded by using a two shaft extruder of 30 mmφ, to obtain a master batch polyester (A).

Further, a copolyester (B) with $[\eta]=0.70$ comprising 80 mol % of terephthalic acid unit and 20 mol % of isophthalic acid unit as the acid component, 97 mol % of ethylene glycol unit and 3 mol % of diethylene glycol unit as the glycol component and containing 400 ppm of amorphous silica of 1.2 μm of average particle size was prepared. The master batch polyester (A) and the copolyester (B) were blended at 30/70 weight % ratio.

After drying the blend as described above by means of a usual method, it was extruded at 280° C. from an extruder and rapidly cooled and solidified to obtain a non-stretched film. The resultant not-stretched film was introduced into a tenter in which it was stretched transversely by 4.0 times at a stretching temperature of 80° C. and applied with heat treatment at 85° C. for 8 sec, cooled and then taken up. During the heat treatment, 2% relaxation was applied in the longitudinal direction. The average thickness of the resultant film was about 40 μm.

EXAMPLE 2

A master batch polyester (C) was obtained by using 2-(2'-hydroxy-5'-methylphenyl)benzotriazole (Tinuvin P;trade mark of products manufactured by Ciba-Geigy, Ltd.) ($T_{10}=198°$ C.) as the ultraviolet absorber to be kneaded in the polyester (A) of Example 1.

The resultant polyester (C) and the polyester (B) were blended at 20/80 weight % ratio, extruded and made into a film in the same manner as in Example 1 to obtain a film of about 40 μm of average thickness.

COMPARATIVE EXAMPLE 1

Using the polyester (B), a film of about 40 μm average thickness was obtained by applying extrusion and film-formation in the same way as in Example 1.

COMPARATIVE EXAMPLE 2

A polyvinyl chloride shrinkable film (average thickness of 40 μm) containing 2.0% by weight of the same ultraviolet absorber, 2-(2'-hydroxy-5'-methylphenyl)-benzotriazole as in Example 2 was used as the Comparative Example 2.

EXAMPLE 3

After drying a copolyester (D) with $[\eta]=0.72$ comprising a terephthalic acid unit as the acid component and 88 mol % of ethylene glycol unit and 12 mol % of neopentyl glycol unit as the glycol component, 20 wt % by weight of 2-[2'-hydroxy-3', 5'-bis(α,α-dimethylbenzyl)phenyl]-2H-benzotriazole (Tinuvin 234, registered trade mark of products manufactured by Ciba-Geigy, Ltd.) ($T_{10}=305°$ C.) was kneaded therewith to obtain a master batch polyester (E).

The polyester (D) and the polyester (E) was blended at 80/20 weight % ratio, extruded at 280° C. and rapidly cooled and solidified to obtain a non-stretched film. The resultant non-stretched film was stretched by 3.5 times at 85° C. in the longitudinal direction by the difference in the circumferential speeds between a heating roll and a cooling roll and, heat treatment was applied to the film by contacting the film with a heating roll at 92° C. for 0.2 sec. The average thickness of the resultant film was 50 μm.

EXAMPLE 4

A copolyester (F) with $[\eta]=0.79$ comprising terephthalic acid unit as the acid component and 80 mol % of ethylene glycol unit and 20 mol % of 1,4-cyclohexane dimethanol unit as the glycol component was blended with the polyester (E) at 80/20 weight % ratio. The blend was extruded and formed into a film in the same manner as in Example 3 to obtain a film of 50 μm of average thickness.

The properties of the resultant films are collectively shown in Table 1.

TABLE 1

| | Shrinkage (%) | | Light transmittance at 390 nm (%) | Strength at Break (kg/mm²) | Film Durability | Storability of contens |
|---|---|---|---|---|---|---|
| | longitudinal direction | transverse direction | | | | |
| Example | | | | | | |

TABLE 1-continued

|  | Shrinkage (%) | | Light transmittance at 390 nm (%) | Strength at Break (kg/mm²) | Film Durability | Storability of contens |
| --- | --- | --- | --- | --- | --- | --- |
|  | longitudinal direction | transverse direction | | | | |
| 1 | 3 | 48 | 4.5 | 31.2 | O | O |
| 2 | 2 | 51 | 4.8 | 30.7 | O | O |
| 3 | 52 | 0 | 3.7 | 28.7 | O | O |
| 4 | 54 | −1 | 3.7 | 27.6 | O | O |
| Comparative Example 1 | 2 | 54 | 76.0 | 30.3 | O | X |
| Comparative Example 2 | 6 | 57 | 4.8 | 13.0 | X | O |

What is claimed is:

1. A polyester shrinkable film containing from 0.1 to 20% by weight of an ultraviolet absorber having 10% weight loss temperature ($T_{10}$) upon thermogravimetric analysis of not lower than 200°C., which film has a shrinkage from 30 to 80% in one direction of either the longitudinal direction or the transverse direction and a shrinkage from −5 to 10% in the other direction perpendicular to the main shrinking direction after treatment of 5 minutes at 100° C. in an air oven, and a light transmittance at a wavelength of 390 nm of not greater than 20%.

2. The polyester shrinkable film according to claim 1, wherein the ultraviolet absorber is selected from the group consisting of benzophenone type absorbers, benzotriazole type absorbers, salicylic acid derivative type absorbers, cyanoacrylate type absorbers and oxalic acid anilide type absorbers.

3. The polyester shrinkable film according to claim 1, wherein the ultraviolet absorber is 2-(2′-hydroxy-5′-t-octylphenyl)benzotriazole.

4. The polyester shrinkable film according to claim 1, wherein the ultraviolet absorber is 2-(2′-hydroxy-5′-methylphenyl)benzotriazole.

5. The polyester shrinkable film according to claim 1, wherein the ultraviolet absorber is 2-[2′-hydroxy-3′,5′-bis (α,α- dimethylbenzyl)phenyl]-2H-benzotriazole.

* * * * *

UNITED STATES PATENT AND TRADEMARK OFFICE
CERTIFICATE OF CORRECTION

PATENT NO. : 4,983,653

DATED : January 8, 1991

INVENTOR(S) : Yujiro Fukud-, et. al.

It is certified that error appears in the above-identified patent and that said Letters Patent is hereby corrected as shown below:

On the Title page

Delete in Column 1 [*] Notice: The portion of the term of this patent subsequent to May 2, 2008 has been disclaimed.

Signed and Sealed this

Twenty-ninth Day of December, 1992

Attest:

DOUGLAS B. COMER

Attesting Officer

Acting Commissioner of Patents and Trademarks